(12) United States Patent
Maca et al.

(10) Patent No.: US 6,745,003 B1
(45) Date of Patent: Jun. 1, 2004

(54) ADAPTIVE CANCELLATION FOR WIRELESS REPEATERS

(75) Inventors: Gregory A. Maca; Mano D. Judd, both of Rockwall, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/483,234

(22) Filed: Jan. 14, 2000

Related U.S. Application Data (63) Continuation-in-part of application No. 09/357,032, filed on Jul. 20, 1999.

(51) Int. Cl.$^7$ ................................................ H04B 7/15
(52) U.S. Cl. ........................ 455/11.1; 455/24; 455/63; 455/67.1; 455/67.3; 455/562
(58) Field of Search .............................. 455/7, 11.1, 24, 455/278.1, 63, 67.1, 67.3, 280, 296, 90, 422, 561, 562, 571; 343/702, 824

(56) References Cited

U.S. PATENT DOCUMENTS

| | | | |
|---|---|---|---|
| 3,728,733 A | 4/1973 | Robinson | 343/765 |
| 3,731,315 A | 5/1973 | Sheleg | 343/854 |
| 4,032,922 A | 6/1977 | Provencher | 343/854 |
| 4,041,389 A | 8/1977 | Oades | 325/3 |
| 4,099,036 A | 7/1978 | Migeon | 179/170 J |
| 4,189,675 A | 2/1980 | Reilly et al. | 325/4 |
| 4,198,600 A | 4/1980 | Oguchi et al. | 455/15 |
| 4,246,585 A | 1/1981 | Mailloux | 343/854 |
| 4,317,217 A * | 2/1982 | Davidson et al. | 455/24 |
| 4,318,104 A | 3/1982 | Enein | 343/100 LE |
| 4,338,605 A | 7/1982 | Mims | 343/100 LE |
| 4,352,202 A | 9/1982 | Carney | 455/151 |
| 4,407,001 A | 9/1983 | Schmidt | 343/840 |
| 4,446,463 A | 5/1984 | Irzinski | 343/371 |
| 4,701,935 A | 10/1987 | Namiki | 374/4 |
| 4,727,590 A | 2/1988 | Kawano et al. | 455/33 |
| 4,777,652 A | 10/1988 | Stolarczyk | 455/3 |
| 4,789,993 A | 12/1988 | Ryu | 375/4 |
| 4,843,402 A | 6/1989 | Clement | 343/758 |
| 4,849,763 A | 7/1989 | DuFort | 342/372 |
| 4,849,963 A | 7/1989 | Kawano et al. | 370/30 |
| 4,879,711 A | 11/1989 | Rosen | 370/50 |
| 4,973,971 A | 11/1990 | Sinsky et al. | 342/373 |
| 4,980,665 A | 12/1990 | Schotz | 340/310 R |
| 4,994,813 A | 2/1991 | Shiramatsu et al. | 342/360 |
| 5,019,793 A | 5/1991 | McNab | 333/156 |
| 5,054,120 A * | 10/1991 | Ushiyama et al. | 455/280 |
| 5,086,302 A | 2/1992 | Miller | 342/373 |
| 5,089,823 A | 2/1992 | Vasile | 342/383 |
| 5,115,514 A * | 5/1992 | Leslie | 455/24 |
| 5,128,687 A | 7/1992 | Fay | 343/754 |
| 5,241,410 A | 8/1993 | Streck et al. | 359/176 |
| 5,321,412 A | 6/1994 | Kopp et al. | 343/742 |

(List continued on next page.)

FOREIGN PATENT DOCUMENTS

| | | | | |
|---|---|---|---|---|
| GB | GB 2 286 749 A | | 8/1995 | |
| WO | W0 97/42720 | * | 11/1997 | H04B/7/26 |
| WO | WO 98/11626 | | 3/1998 | |

Primary Examiner—Quochien B. Vuong
(74) Attorney, Agent, or Firm—Wood, Herron & Evans, L.L.P.

(57) ABSTRACT

A repeater system has at least one donor antenna element for communicating with a base station and at least one link antenna element for communicating with a remote station. A radio frequency uplink path and a radio frequency downlink path are coupled between the donor antenna and the null antenna. An adaptive cancellation circuit in each of the radio frequency uplink path and the radio frequency downlink path generates a cancellation signal, which when added to a radio frequency signal in either of the radio frequency uplink and radio frequency downlink paths, substantially cancels any feedback signal present in the radio frequency signal.

31 Claims, 6 Drawing Sheets

U.S. PATENT DOCUMENTS

| | | | | |
|---|---|---|---|---|
| 5,349,694 A | | 9/1994 | Kawano et al. | 455/11.1 |
| 5,351,060 A | | 9/1994 | Bayne | 343/766 |
| 5,392,054 A | | 2/1995 | Bottomley et al. | 343/702 |
| 5,444,864 A | * | 8/1995 | Smith | 455/24 |
| 5,463,401 A | | 10/1995 | Iwasaki | 342/359 |
| 5,485,170 A | | 1/1996 | McCarrick | 343/895 |
| 5,486,835 A | | 1/1996 | Hock | 342/359 |
| 5,512,906 A | | 4/1996 | Speciale | 342/375 |
| 5,587,715 A | | 12/1996 | Lewis | 342/357 |
| 5,589,843 A | | 12/1996 | Meredith et al. | 343/820 |
| 5,600,333 A | * | 2/1997 | Justice et al. | 343/713 |
| 5,633,647 A | | 5/1997 | Tines | 343/766 |
| 5,663,736 A | | 9/1997 | Webb et al. | 342/375 |
| 5,754,138 A | | 5/1998 | Turcotte et al. | 342/373 |
| 5,754,139 A | | 5/1998 | Turcotte et al. | 342/373 |
| 5,767,807 A | | 6/1998 | Pritchett | 342/374 |
| 5,805,113 A | | 9/1998 | Ogino et al. | 343/713 |
| 5,832,365 A | | 11/1998 | Chen et al. | 455/15 |
| 5,835,848 A | * | 11/1998 | Bi et al. | 455/278.1 |
| 5,856,804 A | | 1/1999 | Turcotte et al. | 342/371 |
| 5,937,332 A | * | 8/1999 | Karabinis | 455/11.1 |
| 5,943,618 A | | 8/1999 | Jackson et al. | 455/426 |
| 5,963,847 A | * | 10/1999 | Ito et al. | 455/24 |
| 6,029,848 A | | 2/2000 | Treatch | 455/7 |
| 6,043,790 A | | 3/2000 | Derneryd et al. | 343/853 |
| 6,049,315 A | | 4/2000 | Meyer | 343/895 |
| 6,078,787 A | | 6/2000 | Schefte, deceased et al. | 455/16 |
| 6,125,109 A | * | 9/2000 | Fuerter | 455/11.1 |
| 6,128,471 A | * | 10/2000 | Quelch | 455/562 |
| 6,128,557 A | | 10/2000 | Fenton et al. | 701/13 |
| 6,198,460 B1 | | 3/2001 | Brankovic | 343/879 |
| 6,256,484 B1 | | 7/2001 | Conner et al. | 455/137 |
| 6,285,878 B1 | | 9/2001 | Lai | 455/431 |
| 6,348,986 B1 | | 2/2002 | Doucet et al. | 359/172 |

\* cited by examiner

ADAPTIVE CANCELLATION FOR WIRELESS REPEATERS

CROSS-REFERENCE TO RELATED APPLICATION

This application is a continuation-in-part of prior application Ser. No. 09/357,032, filed Jul. 20, 1999 entitled "Side-to-Side Repeater".

FIELD OF THE INVENTION

This invention is directed generally to repeater systems for wireless communications and more particular to a method and apparatus for improving the isolation between donor and null antennas in a repeater system.

BACKGROUND OF THE INVENTION

In existing wireless technologies, such as Cellular, PCS (personal communication services), MMDS (multi-user multipath distribution system), WLL (wireless local loop), or the like, repeaters are used to extend coverage of cell sites (base stations) to areas that have low signal reception power, and therefore low signal to noise ratios. One of the principle technology drivers is that of system gain. That is, the higher the gain, the greater the range (distance) and coverage area for the system.

A limiting characteristic for repeaters is that of the feedback loop, or conversely, the isolation between the two opposing antennas (or sensors). That is, the total front to back (F/B) ratio for the system, or isolation, must be higher than the desired gain. Usually, repeaters employ at least one "link" or "donor" antenna which communicates with the base station and at least one broadcast, coverage, or "null" antenna which communicates with the remote stations or subscribers. Generally speaking, the isolation between link and null antennas is equal to the total gain plus some margin, typically around 10 to 15 dB. Therefore, the system gain will in general be less than the isolation minus the margin. For example, if the isolation between antennas is around 60 dB, then the maximum system gain allowed will be about 45 dB. For PCS frequencies, these figures result in a repeater range of less than 100 feet.

In a scattering environment, which is common in PCS, every 6 dB of additional system gain will double the coverage distance. Thus, obtaining an additional 24 dB of isolation between the two antennas, will allow the range to double 4 times, to 1600 feet. For conventional repeater systems, where the two antennas and repeater electronics are in three separate enclosures, and locations, the link (donor) antenna (to the base station) and broadcast (null) antenna (to the desired coverage area), are separated in space by (usually) more than 10 feet. This distance adds over 50 dB to the isolation between antennas, generating a total isolation value of well over 100 dB. Therefore, with a 15 dB margin, this type of system can utilize a total gain of up to 85 dB or more, which results in fairly large range and coverage.

For the side-to-side repeater technologies (as described in the above-referenced prior application), where the opposing antennas are in the same enclosure, and separated in space often by less than a few inches, the F/B ratio (or isolation) is typically limited to a value below 80 dB or so. This therefore allows a total system gain of no more than 65 dB, which limits the system range to a few hundred feet or less.

SUMMARY OF THE INVENTION

The invention provides a method and apparatus for improving isolation between donor and null antennas in a repeater system.

The described embodiment of the invention provides an adaptive cancellation approach which removes a significant portion (between 10 dB and 40 dB), of the feedback signal power, therefore increasing the total system isolation by the same amount (10 to 40 dB). This additional isolation can be used to achieve greater system gain, and therefore significantly extend the range of the system. This is especially useful in the side-side repeater technology approach mentioned above and described in the above-referenced application. The cancellation scheme uses digitally processed information to generate a signal, which, when added to the original input signal, cancels the feedback signal.

DETAILED DESCRIPTION OF THE ILLUSTRATED EMBODIMENT

Figure 1:
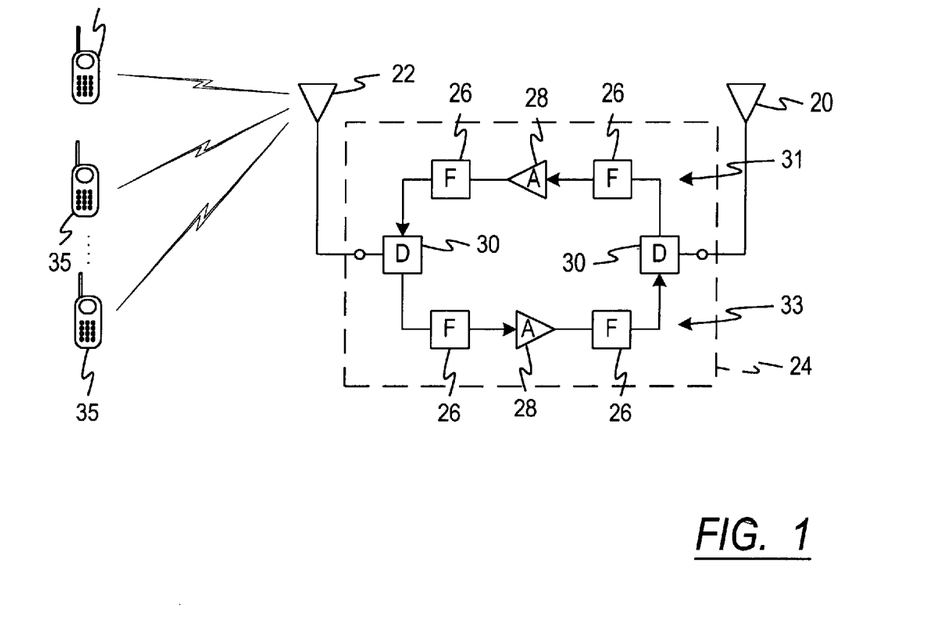
FIG. 1 is a block diagram of one form of a conventional repeater system.

FIG. 1 shows a block diagram of a conventional repeater system, showing three distinct elements: the link (or "donor") antenna, the coverage (or "null") antenna 22, and the repeater electronics 24. The typical repeater electronic system 24 incorporates bandpass filters 26, for the uplink and downlink bands, as well as power amplifiers 28 and frequency diplexers 30. The filters 26 and amplifiers 28 are arranged as a pair of signal transmission circuits 31 (downlink) and 33 (uplink). In each circuit 31, 33, a first filter 26 attenuates the bandwidth of incoming communications signals, an amplifier 28 amplifies the signals from the first filter, and a second filter 26 located at the output of the amplifier protects the amplifier 28 from signal power in the other branches of the circuits 31, 33. The illustrated system in FIG. 1 is based on a "straight through" design, in which the signals go in a single direction through each branch or path (i.e., uplink and downlink) of the system.

Figure 2:
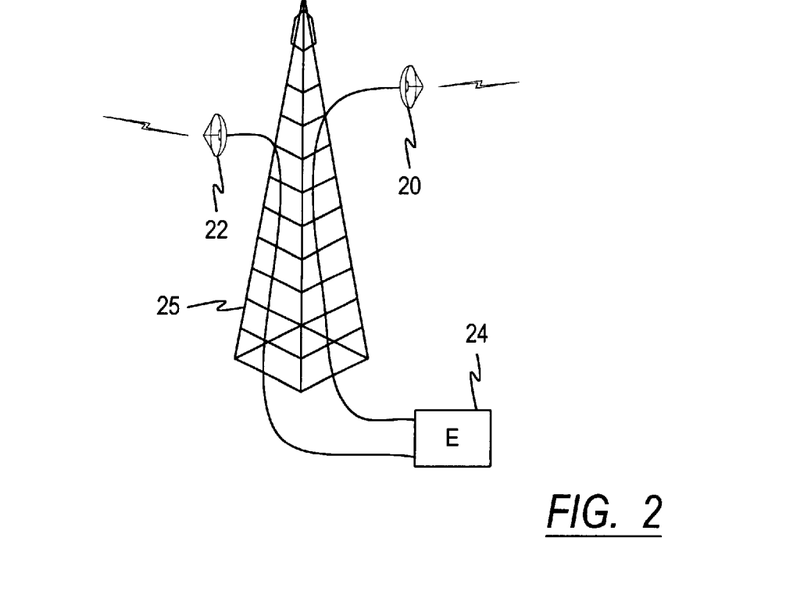
FIG. 2 is a diagram of a typical repeater tower, with the conventional repeater system of FIG. 1.

FIG. 2 shows a diagram of a typical repeater tower 25, with the system of FIG. 1, including the link (or "donor") antenna 20, the coverage (or "null") antenna 22, and the repeater electronics 24. This system could also be installed on the top of a building, or within a building (for in-building coverage).

Figure 3:
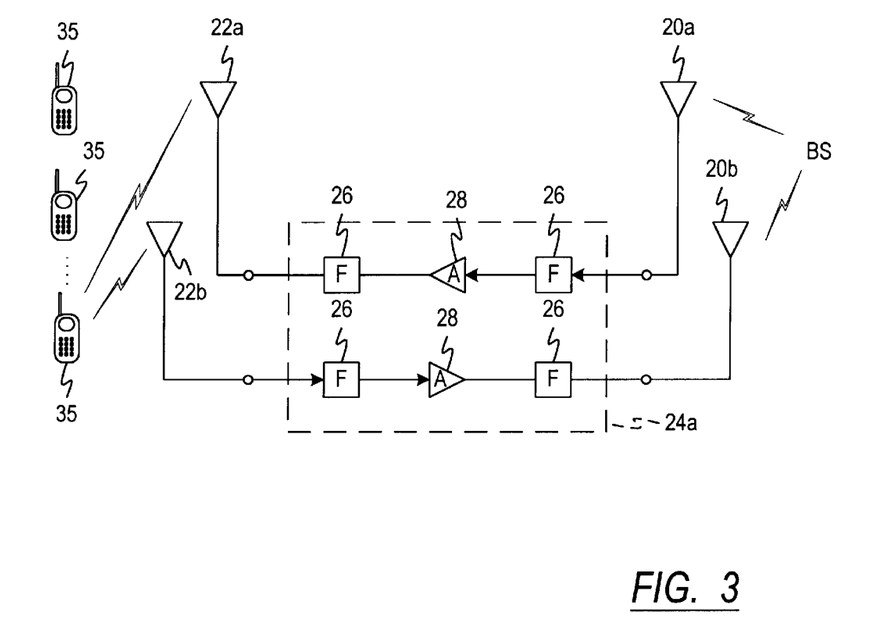
FIG. 3 is a block diagram of another form of a conventional system (similar to FIG. 1), with four distinct input/output ports for separate uplink and downlink antennas.

FIG. 3 shows a similar system to that of FIG. 1, but with four distinct input/output ports. In this system, the signals from each path are not combined by frequency diplexers. Additionally, this system requires four, rather than two, antennas. Accordingly, FIG. 3 shows two donor antennas 20a and 20b, designated as the downlink and uplink to the base station (BS). Similarly, on the broadcast or coverage side, two null antennas 22a, 22b are shown, one functioning as the uplink and one as the downlink antenna relative to the remote units or subscriber equipment 35. Since separate antennas are used respectively for the uplink and downlink between the base station and the remote units, separate paths through the electronics 24a, each including their own filters 26 and amplifier 28 are provided, and diplexers such as the diplexers 30 of FIG. 1 are not utilized.

Figure 4:
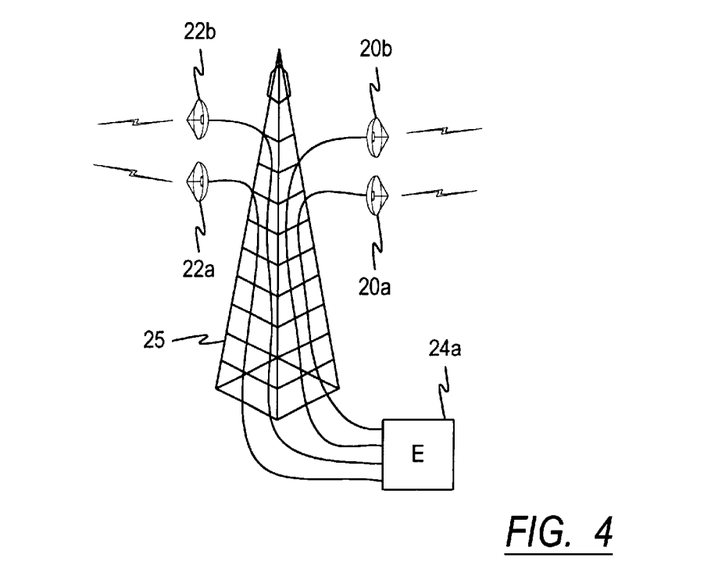
FIG. 4 shows a tower-top arrangement, using the four-port system of FIG. 3.

FIG. 4 shows a tower arrangement, using the four-port system of FIG. 3. In FIG. 4, the respective downlink and uplink antennas 20a, 22a and 20b, 22b between the base station and the remotes are illustrated on the tower 25, with the electronics 24a of FIG. 3 being located at the base of the tower 25.

Figure 5:
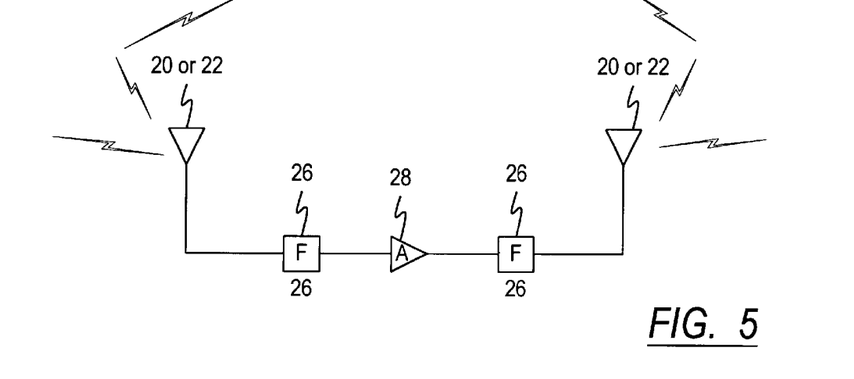
FIG. 5 is a block diagram of one signal path through a repeater system.

FIG. 5 shows a block diagram of one path through a repeater system. The input signal, S(t), either from the base station (for the downlink path), or from the remote (for the uplink path), is received via an antenna, bandpass filtered, amplified (with active gain=G), filtered again, and finally transmitted by an antenna. Some of the transmitted signal energy couples back (through space, or through the electronics) into the receive antenna. This is denoted in FIG. 5 as the feedback signal, f(t), which is simply a delayed version (attenuated) of the original signal, S(t). Therefore, the composite signal, S(t)+f(t), is fed into the amplifier, with output G(S(t)+f(t)). Assume for example, that the antennas have 0 dBi gain, then the new feedback signal it G f(t). The propagation of this signal, back to the input antenna, will incur attenuation, H. Therefore, the amplified, attenuated signal at the input antenna will be H G f(t). If this signal is comparable in power to the original signal S(t), then the amplifier 28 will go unstable, and oscillate (ring). This oscillation will cause severe distortion in the desired signal.

Figure 6:
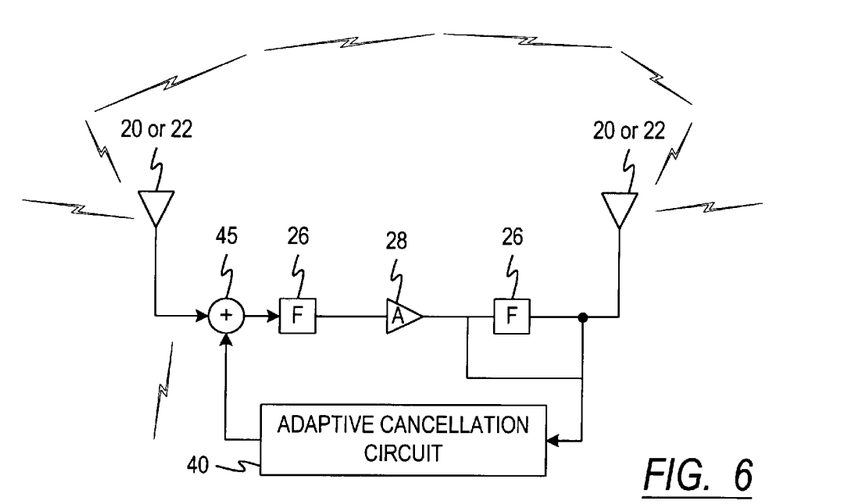
FIG. 6 is a block diagram of one signal path through a repeater system, as in FIG. 5, adding an adaptive cancellation circuit.

FIG. 6 shows the same circuit as FIG. 5; however, adding an adaptive cancellation circuit 40. The goal of this circuit 40 is to create a inverse f(t) signal−f(t) (a 180 degree shifted f(t) signal), and sum it with the input signal; including the feedback signal, f(t) at a summing junction 45, and thereby remove the feedback signal f(t).

Figure 7:
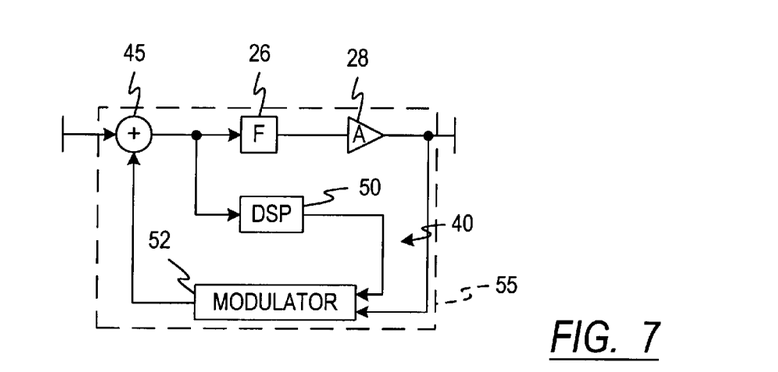
FIG. 7 is a block diagram (high level) of a (digitally) adaptive cancellation circuit to in accordance with one embodiment of the invention.

FIG. 7 shows a general block diagram (high level) of one form of the adaptive cancellation circuit 40. In this approach, the input (RF) signal is summed at the junction 45 with a modulated signal constructed via a digitally adaptive process, to destructively interfere with the feedback signal embedded in the input composite signal. After the summation, the composite signal, S(t)+f(t), is digitally sampled and digitally processed via a digital signal processor (DSP) 50, which computes an intermediate signal for a modulator 52. The modulator 52 takes the intermediate signal, and a sample of the amplified (output) signal, and creates a near copy of the correct inverted f(t) signal−f(t). This process will work with many, if not most, of the digitally adaptive algorithms for feedback control. Additionally, this methodology does not require a injected signal (training or pilot tone, or wideband noise), for the adaptive process. The entire circuit shown in FIG. 7 may be designated as an "AC block" 55.

Figure 8:
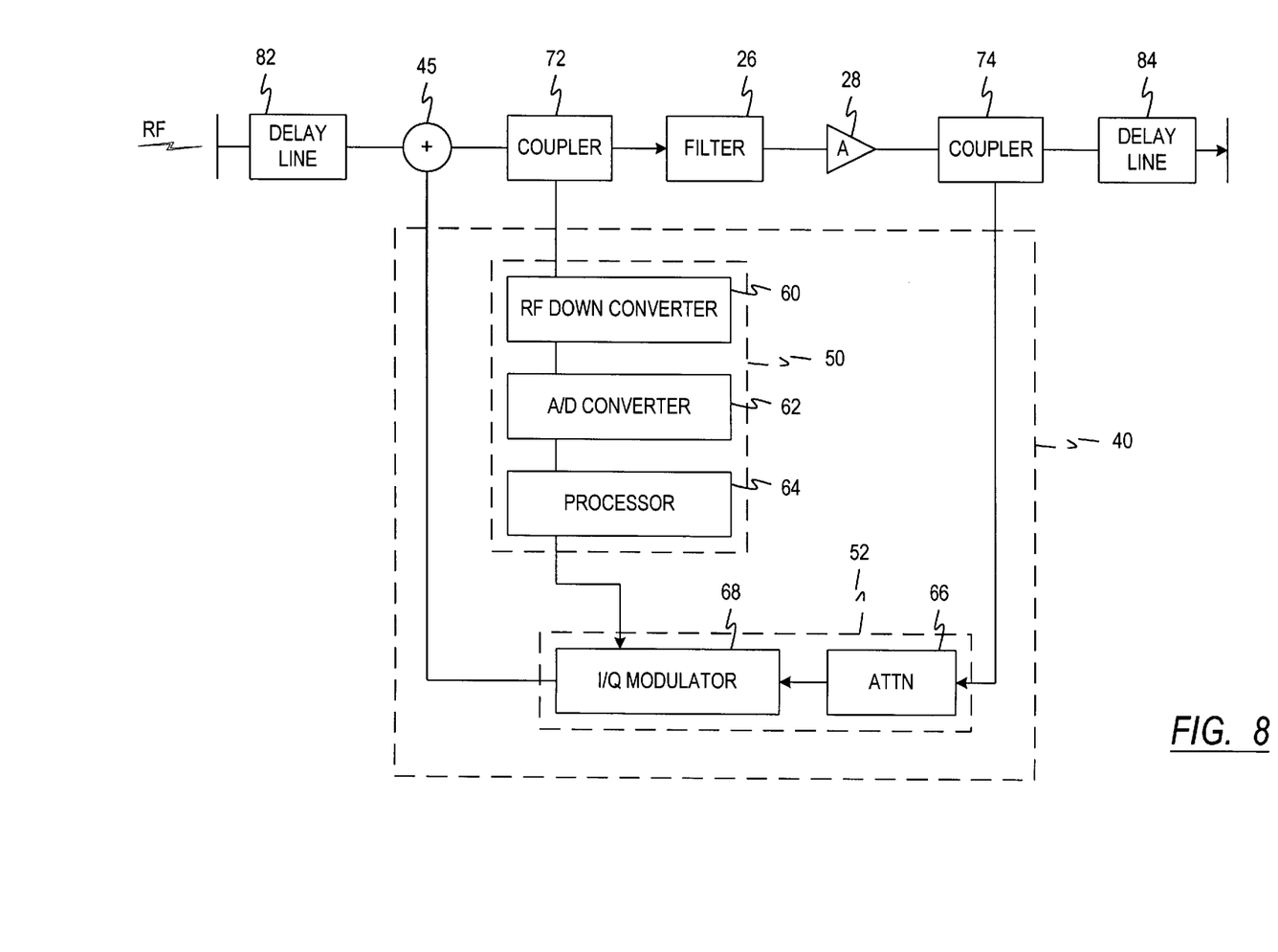
FIG. 8 is a block diagram (high level) of the (digitally) adaptive cancellation circuit of FIG. 7 which shows the technique in further detail.

FIG. 8 shows the circuit 40 in further detail. The DSP 50 is a combination of an RF downconverter 62 to shift the signal to an intermediate frequency that allows digital sampling, an analog-to-digital (A/D) converter 62 which digitizes the analog signal, and a processor 64 which performs the required operations to compute the intermediate signal. The modulator 52 is a combination of a controllable attenuator 66, and an I/Q modulator 68. Additional details shown in FIG. 8 include respective couplers 72 and 74 which couple the signals from the signal path to and from the adaptive cancellation circuit 40, a first coupler 72 being interposed between the summation junction 45 and the filter 26 and the second coupler 74 being at the output of the power amplifier 28. In addition to the couplers 72 and 74 respective delay lines 82 and 84 may be employed at either end of the RF path, one just prior to the summing junction 45 and one subsequent to the coupler 74.

Figure 9:
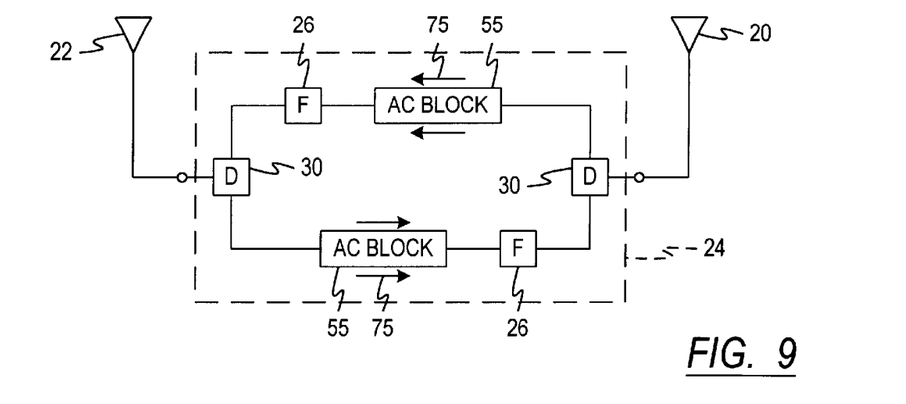
FIG. 9 is a block diagram of a repeater system, similar to that of FIG. 1, using the adaptive cancellation (AC) circuit of FIGS. 7 and 8.
Figure 10A:
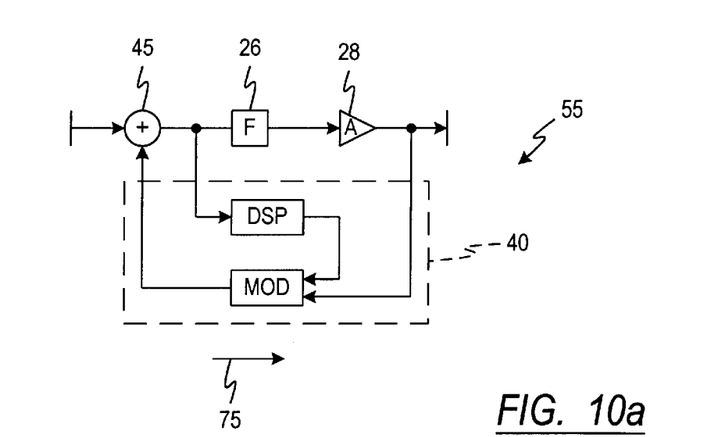
FIGS. 10a and 10b show the directional characteristics of the AC blocks, for the downlink path (FIG. 10a) and the uplink path (FIG. 10b)
Figure 10B:
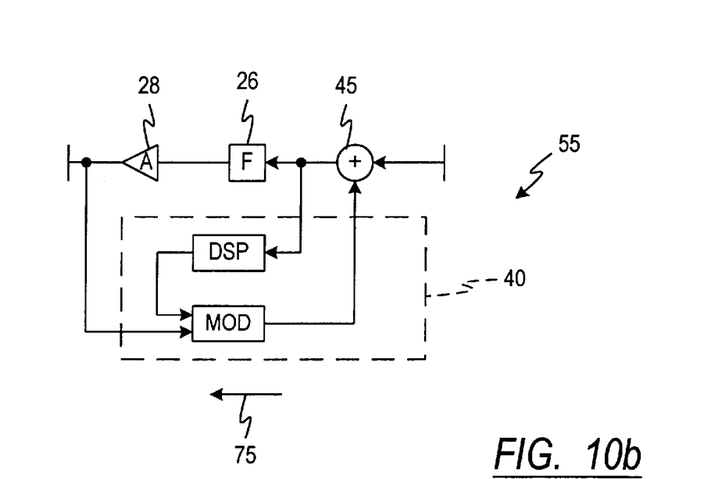

FIG. 9 shows a block diagram of a repeater system, similar to that of FIG. 1, however using adaptive cancellation (AC) circuit blocks 55, details of which are shown in FIGS. 10a and 10b, as well as in FIGS. 7 and 8. The "direction" of the circuit (AC block) 55 in each RF path has been taken into account. In this system, each (uplink, downlink) path has a separate AC circuit block 55.

FIGS. 10a and 10b show the directional characteristics of the AC circuit blocks 55, whether for the downlink or uplink path. The blocks are "mirror images" of one another, differing by the direction of the desired signal, with the arrows 75 denoting the directionality of each circuit 55, in FIGS. 9, 10a and 10a.

Figure 11:
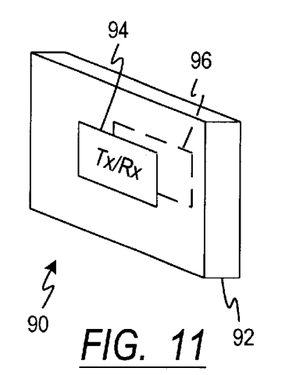
FIGS. 11 and 13 show two examples of side-to-side repeaters.
Figure 12:
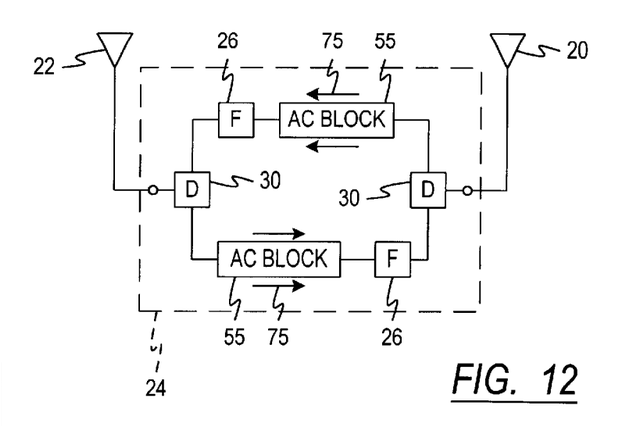
FIGS. 12 and 14 show block diagrams of the AC approach of the invention, applied to the side-to-side repeater systems of FIGS. 11 and 13, respectively.
Figure 14:
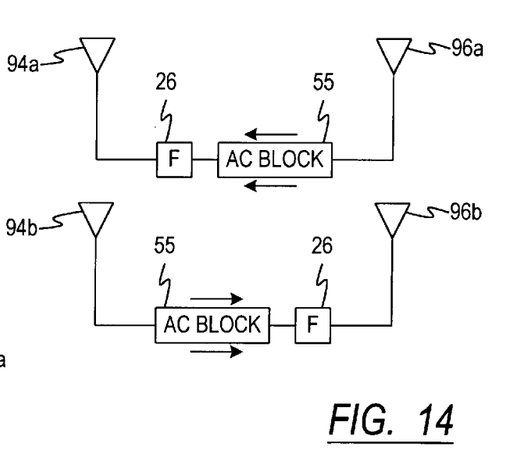

FIGS. 12 and 14 show block diagrams of the adaptive cancellation (AC) approach, applied to side-to-side repeater systems, such as the ones shown and described in the above-referenced prior application. FIG. 11 shows a side-to-side repeater having a body or housing 92 having opposed flat surfaces. To each of these opposed flat surfaces, there is mounted a single patch antenna element 94, 96, respectively comprising the null and donor antennas. An equivalent circuit diagram is shown in FIG. 12. It will be understood that the circuit components of FIG. 12, including the adaptive cancellation (AC) circuits, may be carried in the body or housing 92.

Figure 13:
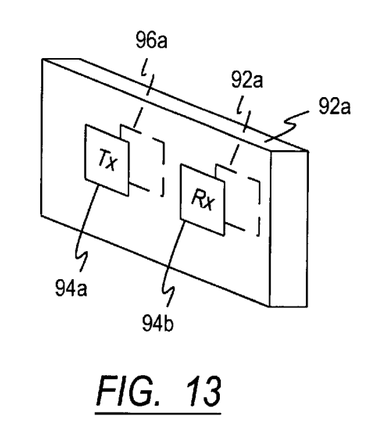

Similarly, FIG. 13 shows a side-to-side repeater structure 90a having a similar body or housing 92a which mounts separate uplink and downlink transmit (Tx) and receive (Rx) patch antenna elements for each of the null and donor antennas. The respective Tx and Rx null antennas are designated by reference numerals 94a and 94b, while the respective Tx and Rx donor antenna elements are designated by reference numerals 96a and 96b. The circuits shown in FIG. 14 may be mounted to (in) the body (housing) 92a.

As indicated above, the electronics, i.e., the adaptive cancellation circuits, may be carried on/in the body/housing 92, 92a of the antenna element in the side-to-side repeater structures of FIGS. 11 and 13, permitting a tower-top modular repeater installation, in addition to the other advantages, and/or use in other applications as more fully discussed and described in the above-referenced prior application.

As indicated above, FIGS. 11 and 12 show the case for a single antenna (element) on each side, including frequency diplexers to separate each path (or frequency band). FIG. 13 and 14 show the approach when using separate Tx and Rx antennas, and therefore separate circuits, for each (uplink, downlink) path.

The above-described approach may be used in a number of applications, including: Cellular Coverage (null fill, in-building systems), PCS, MMDS, WLL and LMDS.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A repeater system comprising:
   a housing having a pair of substantially 180° oppositely facing surfaces;
   at least one donor antenna element for communicating with a base station and at least one null antenna element for communicating with a remote station, wherein said donor and null antenna elements are respectively mounted on said oppositely facing surfaces for radiating energy in opposite directions;
   a radio frequency uplink path and a radio frequency downlink path coupled between said donor antenna and said null antenna; and
   an adaptive cancellation circuit in at least one of said radio frequency uplink path and said radio frequency downlink path and mounted to said housing, which generates a cancellation signal, which when added to a radio frequency signal in either of said radio frequency uplink and radio frequency downlink paths, destructively interferes with any feedback signal present in said radio frequency signal.

2. The system of claim 1 wherein said adaptive cancellation circuit comprises a digital signal processor circuit which receives an incoming radio frequency signal from one of said radio frequency uplink and downlink paths, said radio frequency signal having a feedback signal component, and which digitally samples and processes said incoming radio frequency signal to generate an intermediate frequency signal, and a modulator circuit which receives said intermediate frequency signal and a sample of a radio frequency output signal from said one of said radio frequency uplink and downlink paths and generates said cancellation signal.

3. The system of claim 2 wherein said digital signal processor comprises a radio frequency downconverter which converts said incoming radio frequency signal to a lower frequency signal for digital sampling, an analog-to-digital converter coupled to the radio frequency downconverter, which analog-to-digital converter digitizes said lower frequency signal, and a processor coupled to the analog-to-digital converter which computes a desired intermediate frequency signal for the modulator.

4. The system of claim 2 wherein said adaptive cancellation circuit further includes a summing junction which receives and sums said intermediate frequency signal and said incoming radio frequency signal.

5. The system of claim 4 wherein said digital signal processor circuit receives an output of said summing junction.

6. The system of claim 5 wherein said adaptive cancellation circuit further includes a filter coupled to receive the output of said summing junction and a power amplifier coupled to receive the output of said filter.

7. The system of claim 3 wherein said modulator circuit comprises a controllable attenuator which receives and attenuates the radio frequency output signal and an I/Q modulator coupled to said attenuator and to said processor.

8. The system of claim 1 wherein a single antenna element is mounted to each of said oppositely facing surfaces of said housing and wherein said electronic circuit includes a frequency diplexer operatively coupled with each of said antennas and a pair of signal transmission circuits coupled between said frequency diplexers.

9. The system of claim 8 wherein each of said signal transmission circuits transmits a signal in one direction between said two antenna elements, each of said signal transmission circuits comprising a first filter to attenuate the bandwidth of incoming communications signals, an amplifier to amplify communications signals received from said first filter and a second filter located at an output of said amplifier to protect the amplifier from signal power in the other signal transmission circuit.

10. The system of claim 1 wherein two antenna elements are mounted to each of side of said housing, one for transmitting communications signals and one for receiving communications signals.

11. The system of claim 10 wherein said electronic circuit comprises a pair of signal transmission circuits, each forming a signal path between a transmitting antenna on one surface of said housing and a receiving antenna on the opposite surface of said housing, and wherein each of said signal transmission circuits comprises a first filter to attenuate the bandwidth of incoming communications signals, an amplifier which amplifies communications signals received from the first filter, and a second filter located at an output of said amplifier to protect the amplifier from signal power in the other of said signal transmission circuits.

12. The system of claim 1 wherein each of said antenna elements comprises a microstrip patch.

13. The system of claim 1 wherein said adaptive cancellation circuit is housed within said housing.

14. The system of claim 13 wherein said adaptive cancellation circuit comprises a digital signal processor circuit which receives an incoming radio frequency signal from one of said radio frequency uplink and downlink paths, said radio frequency signal having a feedback signal component, and which digitally samples and processes said incoming radio frequency signal to generate an intermediate frequency signal, and a modulator circuit which receives said intermediate frequency signal and a sample of a radio frequency output signal from said one of said radio frequency uplink and downlink paths and generates said cancellation signal.

15. The system of claim 11 wherein said adaptive cancellation circuit further includes a summing junction which receives and sums said cancellation signal and said incoming radio frequency signal.

16. The system of claim 15 wherein said digital signal processor circuit receives an output of said summing junction.

17. The system of claim 16 wherein said adaptive cancellation circuit further includes a filter coupled to receive the output of said summing junction and a power amplifier coupled to receive the output of said filter.

18. A method of operating a repeater system having a housing with a pair of substantially 180° oppositely facing surfaces, at least one donor antenna element for communicating with a base station and at least one null antenna element for communicating with a remote station, and a radio frequency uplink path and a radio frequency downlink path coupled between said donor antenna and said null antenna, wherein said donor and null antenna elements are respectively mounted on said oppositely facing surfaces for radiating energy in opposite directions, said method comprising:

generating, within an electrical circuit mounted to said housing, a cancellation signal in at least one of said radio frequency uplink path and said radio frequency downlink path, which cancellation signal, when added to a radio frequency signal in either of said radio frequency uplink and radio frequency downlink paths, destructively interferes with any feedback signal present in said radio frequency signal.

19. The method of claim 18 wherein said generating comprises receiving an incoming radio frequency signal from one of said radio frequency uplink and downlink paths, said radio frequency signal having a feedback signal component, digitally sampling and processing said incoming radio frequency signal to generate an intermediate frequency signal, and using said intermediate frequency signal and a sample of a radio frequency output signal from said one of said radio frequency uplink and downlink paths to generate said cancellation signal.

20. The method of claim 19 wherein said processing comprises downconverting said incoming radio frequency signal to a lower frequency signal for digital sampling, digitizing said lower frequency signal, and digitally computing a desired intermediate frequency signal using said digitized lower frequency signal.

21. The system of claim 19 further including a summing said intermediate frequency signal and said incoming radio frequency signal.

22. The method of claim 21 wherein said digitally processing follows said summing.

23. The method of claim 22 further including filtering and power amplifying following said summing.

24. The method of claim 20 wherein said generating further comprises controllably attenuating the radio frequency output signal and I/Q modulating following said attenuating.

25. A repeater system comprising:

a housing having a pair of substantially 180° oppositely facing surfaces;

at least one donor antenna element for communicating with a base station and at least one null antenna element for communicating with a remote station, wherein said donor and null antenna elements are respectively mounted on said oppositely facing surfaces for radiating energy in opposite directions; and an adaptive cancellation circuit mounted to said housing, and which generates a cancellation signal, which when added to a radio frequency signal from either of said donor antenna and said null antenna, destructively interferes with any feedback signal present in said radio frequency signal.

26. The repeater system of claim 25 wherein said adaptive cancellation circuit comprises a digital signal processor circuit which receives an incoming radio frequency signal from one of said donor and null antennas, said radio frequency signal having a feedback signal component, and which digitally samples and processes said incoming radio frequency signal to generate an intermediate frequency signal, and a modulator circuit which receives said intermediate frequency signal and sample of a radio frequency output signal from said one of said donor and null antennas and generated said cancellation signal.

27. The system of claim 26 wherein said digital signal processor comprises a radio frequency downconverter which converts said incoming radio frequency signal to a lower frequency signal for digital sampling, an analog-to-digital converter coupled to the radio frequency downconverter, which analog-to-digital converter digitizes said lower frequency signal, and a processor coupled to the analog-to-digital converter which computes a desired intermediate frequency signal for the modulator.

28. The system of claim 26 wherein said adaptive cancellation circuit further includes a summing junction which receives and sums said intermediate frequency signal and said incoming radio frequency signal.

29. The system of claim 28 wherein said digital signal processor circuit receives an output of said summing junction.

30. The system of claim 29 wherein said adaptive cancellation circuit further includes a filter coupled to receive the output of said summing junction and a power amplifier coupled to receive the output of said filter.

31. The system of claim 27 wherein said modulator circuit comprises a controllable attenuator which receives and attenuates the radio frequency output signal and an I/Q modulator coupled to said attenuator and to said processor.

* * * * *

UNITED STATES PATENT AND TRADEMARK OFFICE
CERTIFICATE OF CORRECTION

PATENT NO. : 6,745,003 B1
DATED : June 1, 2004
INVENTOR(S) : Gregory A. Maca and Mano D. Judd It is certified that error appears in the above-identified patent and that said Letters Patent is hereby corrected as shown below:

Title page,
Item [56], References Cited, U.S. PATENT DOCUMENTS,
after "5,741,138 A    5/1998  Turcotte et al. …..342/373", please insert the reference
-- 5,758,287 A    5/1998  Lee et al. ……….455/450 --.

Column 2,
Line 33, please delete the word "to".

Column 4,
Line 36, please delete the last reference number "10$a$" and insert -- 10$b$ -- therefor.

Column 8,
Line 18, after the word "and", please insert the word -- a --.
Line 20, please delete the word "generated" and insert the word -- generates -- therefor.

Signed and Sealed this

Sixteenth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,745,003 B1
DATED : June 1, 2004
INVENTOR(S) : Gregory A. Maca and Mano D. Judd It is certified that error appears in the above-identified patent and that said Letters Patent is hereby corrected as shown below:

<u>Column 8,</u>
Line 44, please insert the following omitted claims 32-34:
-- 32.   The system of claim 1 wherein said cancellation signal substantially cancels any feedback signal present in said radio frequency signal.

33.   The method of claim 18 wherein said cancellation signal substantially cancels any feedback signal present in said radio frequency signal.

34.   The system of claim 25 wherein said cancellation signal substantially cancels any feedback signal present in said frequency signal. --

Signed and Sealed this

Twenty-second Day of March, 2005

JON W. DUDAS
*Director of the United States Patent and Trademark Office*